(12) United States Patent
Higdon, Jr.

(10) Patent No.: US 6,760,570 B1
(45) Date of Patent: Jul. 6, 2004

(54) WATERPROOF RADIO ENCLOSURE

(76) Inventor: Albert Gene Higdon, Jr., 725 Highway 172, Hubert, NC (US) 28539

(*) Notice: Subject to any disclaimer, the term of this patent is extended or adjusted under 35 U.S.C. 154(b) by 674 days.

(21) Appl. No.: 09/835,660

(22) Filed: Apr. 16, 2001

(51) Int. Cl.[7] .................................................. H04B 1/38
(52) U.S. Cl. .................... 455/90.3; 455/351; 455/575.8
(58) Field of Search ......................... 455/550.1, 575.1, 455/575.6, 575.8, 90.3, 347, 351; 379/428.01, 437, 440

(56) References Cited

U.S. PATENT DOCUMENTS

| | | |
|---|---|---|
| 4,006,764 A | 2/1977 | Yamamoto et al. |
| 4,225,970 A | 9/1980 | Jaramillo et al. |
| 4,489,770 A | 12/1984 | Reich, II |
| 4,584,718 A | 4/1986 | Fuller |
| 5,025,921 A | 6/1991 | Gasparaitis et al. |
| 5,251,326 A | * 10/1993 | Silverman ..................... 455/40 |
| 5,586,168 A | * 12/1996 | Bucalo et al. ........... 455/575.1 |
| 5,706,940 A | 1/1998 | Amarello |
| 5,713,466 A | 2/1998 | Tajima |
| 5,850,915 A | 12/1998 | Tajima |
| 5,872,557 A | 2/1999 | Wiemer et al. |
| 6,029,877 A | 2/2000 | Woods |
| 6,041,924 A | 3/2000 | Tajima |
| 6,042,416 A | 3/2000 | Lopes |
| 6,082,535 A | 7/2000 | Mitchell |

FOREIGN PATENT DOCUMENTS

JP          59126328 A   *   7/1984

* cited by examiner

Primary Examiner—Vivian Chin
Assistant Examiner—A. Behulu
(74) Attorney, Agent, or Firm—MacCord Mason PLLC

(57) ABSTRACT

A waterproof bag system is described for enclosing a portable field radio that includes a transceiver, an antenna, a handset, and antenna and handset cables to join the antenna and handset to the transceiver. The bag system includes a flexible transceiver bag that has a continuous outer wall enclosing an interior transceiver chamber, a sealable transceiver access opening into the chamber, and sealable antenna and handset cable ports extending through said transceiver bag wall for which the antenna and handset can be connected to the transceiver without leakage. The transceiver bag also includes an antenna mount. The handset is separately enclosed by a flexible handset enclosure having an outer wall defining a handset chamber. A sealable cable opening extends through the handset wall. A section of the face of the handset bag is transparent, as is a section of the transceiver bag, permitting viewing of the interior of each bag.

20 Claims, 3 Drawing Sheets

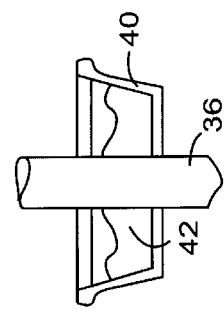
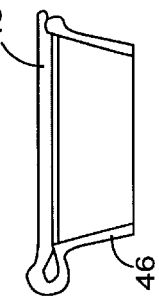
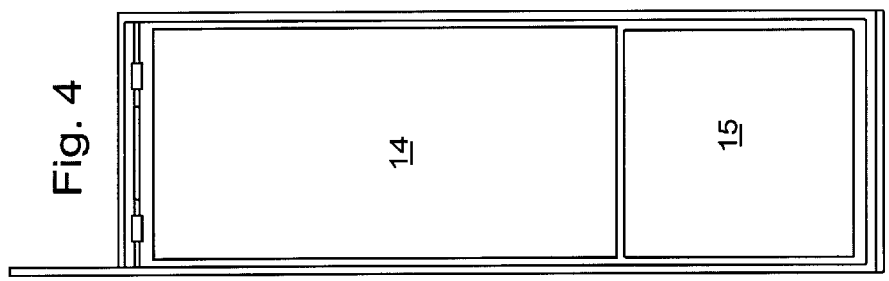
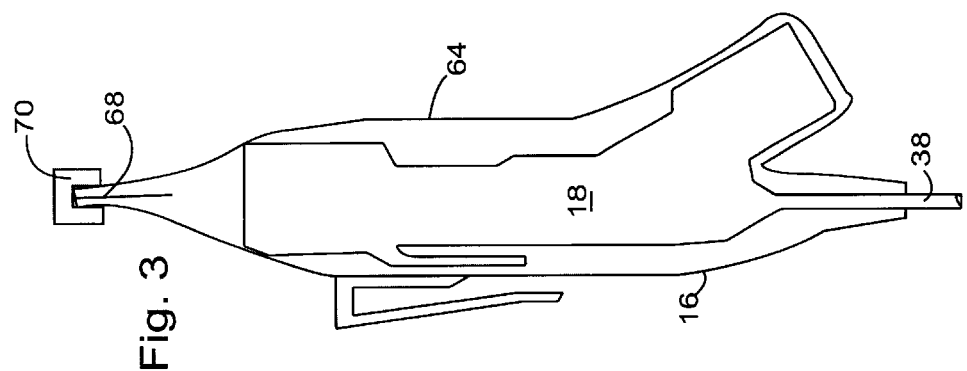

WATERPROOF RADIO ENCLOSURE

BACKGROUND OF THE INVENTION (1) Field of the Invention

The present invention relates generally to a waterproof radio enclosure, and in particular to a waterproof enclosure to be used with a field radio that includes a transceiver with a separate handset.

(2) Description of the Prior Art

Military personnel and other individuals operating in remote outdoor environments often use field radios as a means of communication, either via satellite, or to a distant station. These field radios are generally comprised of a transceiver unit including electronic circuitry for transmission and receipt of communications, with control knobs or other means for activating and adjusting the unit input and output. Dials or other visual indicators are also included to enable the operator to readily determine the state of the unit. The radio also includes an antenna and an operator handset that are connected by an antenna cable and a handset cable, respectively, to the transceiver unit.

Field radios, when used in outdoor environments, are frequently exposed to rain, snow and other wet conditions. Additional exposure of the field radio results from the need to the user to trasverse streams and swampy areas. In order to avoid damage to the field radios from exposure to water, the operator often encloses the radio in a plastic wrapper, such as a plastic bag that is sealed at the top by tape or other means. While placement of the field radio in a sealed plastic bag, if efficiently done, will protect the radio from water damage, encasement of the radio within the bag prevents the operator from using the radio, since the handset is inaccessible. Unwrapping of the radio to gain access to the handset will, of course, again expose the radio to the ambient water.

Therefore, there exists a need for an enclosure for a field radio that will effectively protect the radio from water, while at the same time enabling the operator to use the radio in the protected condition. There is also a need for a combination of a field radio and an enclosure that performs these functions.

SUMMARY OF THE INVENTION

The present invention is directed to a waterproof field radio enclosure that effectively protects the field radio from water without prohibiting usage of the radio in its protected state, and to a combination of a field radio and this protective enclosure.

The invention is generally applicable to field radios comprised of a battery-powered transceiver unit having an antenna and a handset connected to the transceiver by cables. The transceiver and battery, due to their size and weight, are frequently housed in a backpack, rucksack or manpack, usually made of canvas or other fabric, and carried on the back of the operator. Various designs of field radios are known in the prior art, and the exact construction of the field radio per se does not form a unique aspect of this invention, which is generally applicable to all field radios comprised of the above components.

Generally, the field radio enclosure of the invention is comprised of a flexible transceiver bag adapted to enclose the transceiver, and a flexible handset bag adapted to separately enclose the handset. When the field radio is enclosed within the bags, cables are used to connect the antenna and the handset to the transceiver. Waterproof cable connectors are positioned in the wall of the transceiver bag to facilitate connection of the cables without leakage of water into the transceiver bag.

The flexible transceiver bag is comprised of a continuous outer wall with joined top, bottom, side, front and back sections that enclose an interior transceiver chamber of a size at least adequate to enclose the transceiver that is to be protected. The chamber may be sized to include additional space for an auxiliary radio, a repair kit, spare cables, and other gear that might be required while in the field. A separate interior pouch may be attached to one of the chamber walls to store some of this gear.

In order to be able to insert the transceiver, the transceiver bag also includes a sealable access opening through the wall into the chamber. This access opening has a diameter at least as large as the smallest diameter of the transceiver to be inserted, and includes sealing means to reseal the opening after the transceiver is inserted. For example, the opening may be a slit with a zipper that extends horizontally around the front and side walls of the bag to divide the bag into attached upper and lower portions, so that the upper portion can be pivoted away from the lower portion during transceiver insertion.

As noted earlier, the transceiver unit normally includes dials and other condition indicators. In order to be able to view these condition indicators when the transceiver unit is inside the transceiver bag, one section of the bag wall will be transparent. It will be understood that reference to a transparent wall section herein is intended to encompass a wall section that is entirely transparent, as well as a wall section that includes only a transparent component or port. Selection of the wall section that is transparent will depend upon the particular design of the transceiver, since the transparent section will be above the dials and other indicators to be viewed, and more than one transparent wall section may be required.

In order to connect antenna cables and handset cables to the transceiver without leakage of water, the transceiver bag includes waterproof antenna and cable ports in the bag wall. For example these ports may be in the form of plug valves comprised of a sealable wall through which the cable extends. The plug valve may include a continuous side wall and a bottom wall that together form a reservoir that can be filled with a sealant, with the cable projecting through an opening in the bottom wall of the valve. The valve may also include a hinged door or lid to cover the reservoir when the cable is not inserted.

The transceiver bag may also include an antenna mount attached to side or other section of the transceiver bag wall for use in attaching the antenna to the exterior of the transceiver bag. In order to minimize the bulk of the bag, adjustable compression straps may be positioned around the exterior of the wall. For example, upper and lower compression straps may be horizontally attached to the exterior of the transceiver bag wall. These straps can be tightened against the transceiver to minimize the bulk of the bag. These compression straps can also be used to attach the antenna to the bag. The transceiver bag may also include carrying handles and shoulder strap attachment tabs.

The transceiver bag may also include an air valve for inflating the interior of the bag to facilitate flotation of the bag during crossing of streams and other bodies of water. This air valve can also be used to deflate the bag interior, i.e., exhaust air from the interior, so that the bag is submersible and can be held beneath the surface of the water when desired.

A separate flexible bag is used to provide a waterproof bag over the handset. The handset bag is comprised of a continuous outer wall defining an interior handset chamber to receive the handset. The handset bag wall includes a transparent face so that the handset can be viewed. This wall is also of a flexible material, such as a sheet of plastic. The handset bag wall includes a lower sealable cable lower opening, and an upper sealable handset insertion opening on the opposite side of the handset bag. A releasable clip is used to seal the handset insertion opening. The handset bag can be configured to the shape of the handset to minimize bulkiness.

When assembled, the field radio transceiver is inserted into the interior cavity or chamber of the transceiver bag. Before or prior to insertion of the transceiver, antenna and handset connector cables having inner transceiver connection ends and outer antenna and handset connection ends, respectively, are inserted through ports or plug valves in the transceiver bag wall. The cable inner ends are connected to the transceiver at appropriate connectors depending on the transceiver design, and the zipper is closed to form a waterproof seal around the transceiver.

The antenna is mounted on the antenna mount, which is secured to the exterior of the transceiver bag, and the outer end of the antenna cable is attached to the antenna. In a preferred embodiment, the antenna mount is comprised of a bag attachment bracket that is secured vertically to the transceiver bag, with a horizontal antenna attachment bracket extending outwardly from the bag attachment bracket.

The outer end of the handset cable projects through the cable opening of the handset bag and into the handset bag interior for attachment to the handset. The handset is inserted into the upper opening of the handset bag, which is later sealed, e.g., with a detachable clip, to prevent entry of water into the handset bag. The lower opening is also sealed around the handset cable, e.g., with a suitable sealant. The handset bag can also include an external clip, e.g., on the back of the bag, for use in attaching the handset bag to the transceiver bag, or to the operator's clothing.

Thus, when a field radio is secured within the transceiver bag and the handset bags, with the handset and antenna being connected by cables, the radio is fully protected from water, while still being usable by the operator. When the radio is to be used, the operator simply manipulates the handset controls through the flexible bag, with the controls, dials and other information indicators being fully visible to the operator through the transparent panels.

BRIEF DESCRIPTION OF THE DRAWINGS

FIG. 3 is a sectional side view of the handset bag.

FIG. 4 is a sectional side view of the transceiver bag.

FIG. 5 is a sectional side view of a plug valve.

FIG. 6 is a sectional side view of a port valve.

DETAILED DESCRIPTION OF THE INVENTION

Figure 1:
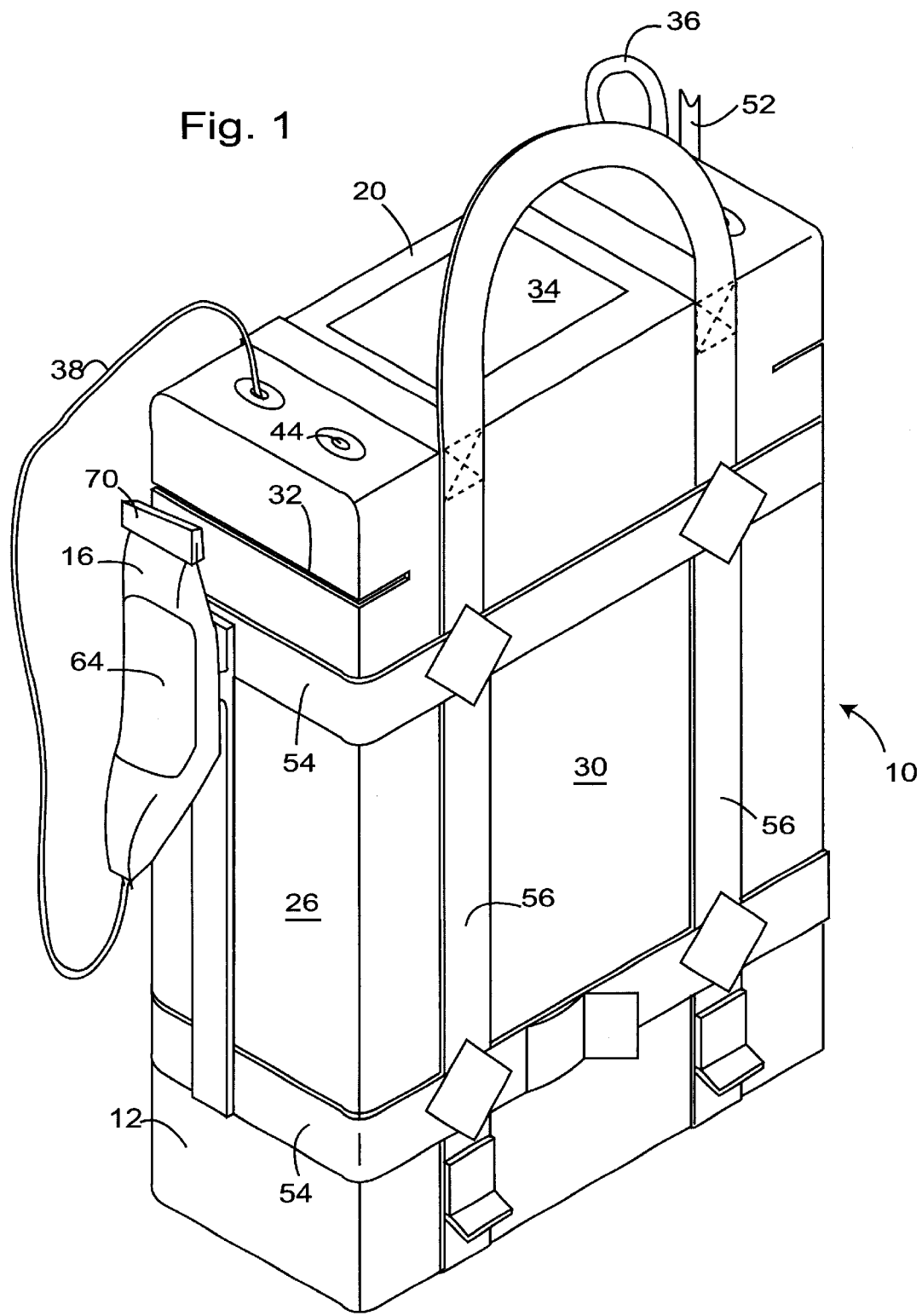
FIG. 1 is a perspective view of the field radio seen from the rear.
Figure 2:
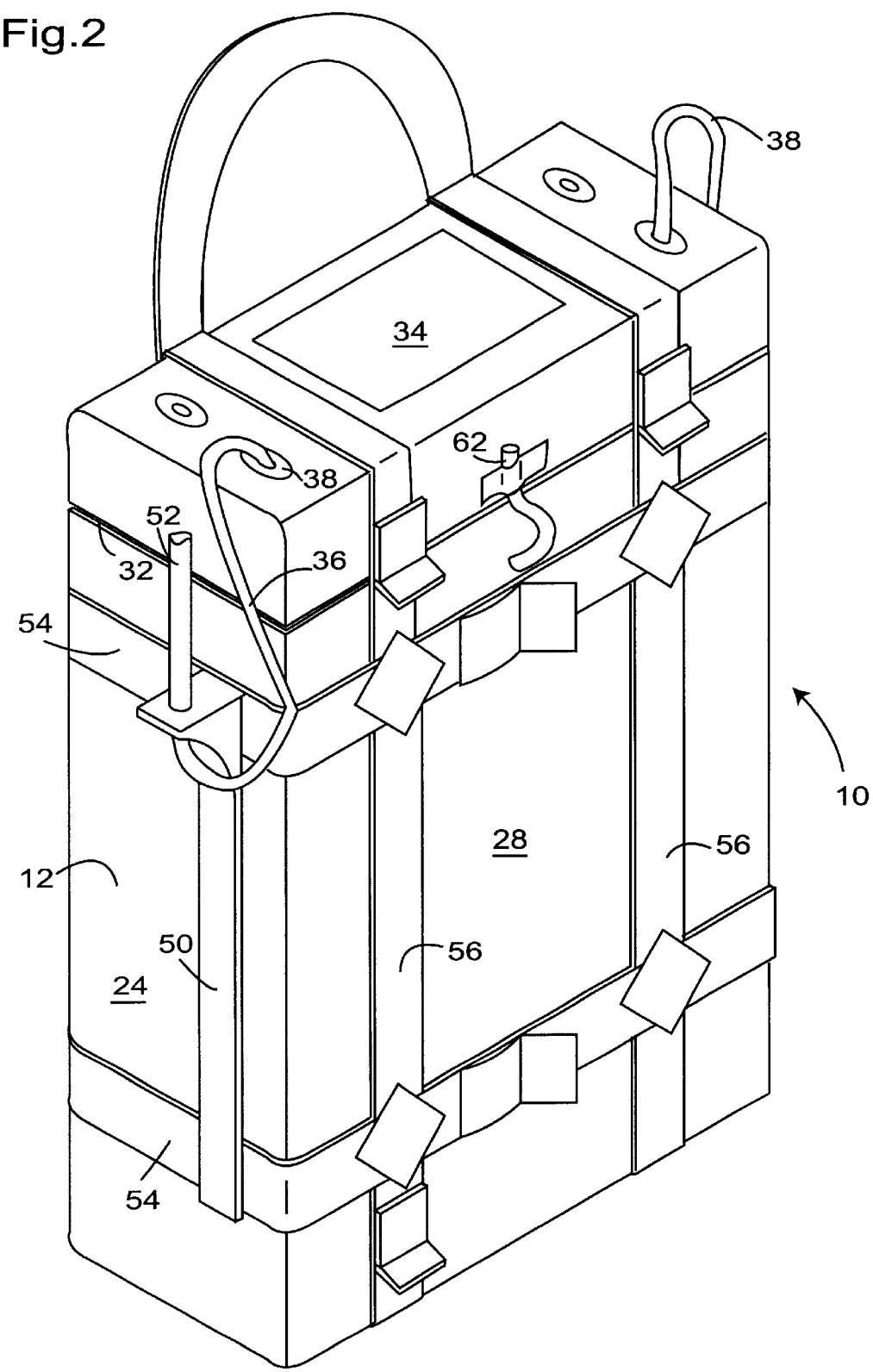
FIG. 2 is a perspective view of the field radio seen from the front.

The drawings are for the purpose of illustrating the invention and are not intended to be to scale.

Field radio, generally 10, is comprised of a flexible transceiver bag 12 to enclose transceiver 14 and flexible handset bag 16 adapted to separately enclose handset 18. Transceiver bag 12 is comprised of a continuous outer wall with a top section 20, a bottom section 22, side sections 24 and 26, front section 28 and back section 30 that together form an interior transceiver chamber to enclose the transceiver 14 and any accessories 15, such as an auxiliary radio, a repair kit, spare cables, and other gear. Transceiver bag 12 also includes a zippered access opening 32 for insertion of transceiver 12 into the interior chamber of bag 12.

In order to view dials and other condition indicators, top section 20 includes a transparent viewing panel 34. Antenna cable 36 and handset cable 38 extends into bag 12 to connect with transceiver 14 through plug valves 38, which are illustrated in FIG. 5. Valve 38 includes a flanged housing 40 through which cable 36, as illustrated, or cable 38 extends. Sealant 42 is used to prevent water from entering bag 12 through valve 38. Top section 20 also includes port valves 44, illustrated in FIG. 6, which may be used to remove air from bag 12. Each port valve 44 includes an annular flanged body 46 with a removable hinged cover 48.

Antenna mount 50, supporting antenna 52 is attached to transceiver bag side section 24 and is joined to horizontal compression straps 54. Transceiver bag 12 also includes vertical compression straps 56, used to reduce the bag bulk when tightened with buckles 58. Antenna 52 is in communication with transceiver 14 through cable 36. Bag 12 also includes carrying handle 60. An air valve 62 is used to inflate bag 12 by blowing into valve 62. Valve 62 can also be used to deflate bag 12 by opening valve 62 and compressing bag 12.

The handset bag 16 is comprised of a continuous outer wall defining an interior handset chamber to receive handset 18. Bag 16 includes transparent panel 64 in front of the keys of handset 18. Cable 38 extends through a flexible lower cable opening 66. Upper handset insertion opening 68 is closed by removable waterproof clip 70.

In use, transceiver 12 is inserted into the interior chamber of transceiver bag 12. Handset 18 is positioned inside handset bag 16, with the face of headset 16 toward transparent panel 64. Cables 36 and 38 connect antenna 52 and handset 18, respectively, to transceiver 14.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A waterproof enclosure for a radio that includes a transceiver, an antenna, a handset, and antenna and handset cables to join said antenna and said handset to said transceiver, said enclosure comprising:

a) a flexible transceiver bag adapted to enclose said transceiver, said transceiver bag having a continuous outer wall enclosing an interior transceiver chamber, a sealable access opening through said wall into said chamber, and sealable antenna and handset cable ports extending through said transceiver bag wall;

b) an antenna mount on said transceiver bag wall adapted to support said antenna, and c) a flexible handset bag having an outer wall, an interior handset chamber defined by said outer wall to receive said handset, and a sealable cable opening extending through said outer wall, at least a part of said wall being transparent.

2. The enclosure of claim 1, wherein said transceiver bag includes a transparent top wall section.

3. The enclosure of claim 1, wherein said transceiver bag access opening includes a zipper.

4. The enclosure of claim 1, wherein said transceiver bag includes an air valve to inflate said transceiver bag chamber.

5. The enclosure of claim 1, wherein said cable ports include a sealant.

6. The enclosure of claim 1, wherein said handset enclosure includes a handset insertion opening, and a clip to seal said handset insertion opening.

7. The enclosure of claim 1, further including compression straps attached to said transceiver bag wall.

8. A waterproof enclosure for a radio that includes a transceiver, an antenna, a handset, and antenna and handset cables to join said antenna and said handset to said transceiver, said enclosure comprising:
   a) a flexible transceiver bag adapted to enclose said transceiver, said transceiver bag having a continuous outer wall enclosing an interior transceiver chamber, a sealable access opening through said wall into said chamber, and sealable antenna and handset cable ports extending through said transceiver bag wall, said outer wall including a top wall section and a side wall, at least a part of said top wall section being transparent;
   b) an antenna mount attached to said transceiver bag side wall, said antenna mount being adapted to support said antenna, and
   c) a flexible handset bag having an outer wall defining an interior handset chamber to receive said handset, said handset enclosure including a transparent face, a sealable cable lower opening, and a sealable handset insertion upper opening.

9. The enclosure of claim 8, wherein said handset bag further includes a removable clip to seal said handset insertion opening.

10. The enclosure of claim 8, further including upper and lower compression straps extending horizontally around said transceiver bag.

11. The enclosure of claim 8, wherein said transceiver bag access opening includes a zipper.

12. The enclosure of claim 8, wherein said transceiver bag includes an air valve to inflate said transceiver bag chamber.

13. The enclosure of claim 8, wherein said cable ports extend through said top wall section.

14. The combination of a portable radio and a waterproof bag system comprising:
   a) a portable radio including a transceiver, an antenna, a handset, and antenna and handset cables to join said antenna and said handset to said transceiver;
   b) a flexible transceiver bag adapted to enclose said transceiver, said transceiver bag having a continuous outer wall enclosing an interior transceiver chamber, a sealable access opening through said wall into said chamber, and sealable antenna and handset cable ports extending through said transceiver bag wall;
   c) an antenna mount on said transceiver bag wall adapted to support said antenna; and
   d) a flexible handset enclosure having an outer wall, an interior handset chamber defined by said outer wall to receive said handset, and a sealable cable opening extending through outer wall, at least a part of said wall being transparent.

15. The enclosure of claim 14, wherein said transceiver bag includes a transparent top wall section.

16. The enclosure of claim 14, wherein said transceiver bag access opening includes a zipper.

17. The enclosure of claim 14, wherein said transceiver bag includes an air valve to inflate said transceiver bag chamber.

18. The enclosure of claim 14, wherein said cable ports include a sealant.

19. The enclosure of claim 14, wherein said handset enclosure includes a handset insertion opening, and a clip to seal said handset insertion opening.

20. The enclosure of claim 14, further including compression straps attached to said transceiver bag wall.

* * * * *